United States Patent [19]

Schwartz

[11] 4,014,604
[45] Mar. 29, 1977

[54] SOUND SLIDE
[75] Inventor: Morris Schwartz, Plainville, Conn.
[73] Assignee: Kalart Victor Corporation, Plainville, Conn.
[22] Filed: May 14, 1975
[21] Appl. No.: 577,224

Related U.S. Application Data

[63] Continuation-in-part of Ser. No. 402,168, Oct. 1, 1973, Pat. No. 3,897,145.
[52] U.S. Cl. .............................. 353/120; 353/19; 360/2; 360/101
[51] Int. Cl.² ................ G03B 21/00; G03B 31/06; G11B 21/02
[58] Field of Search ............. 353/19, 120; 360/2, 360/101

[56] References Cited
UNITED STATES PATENTS

| 2,925,753 | 2/1960 | Schwartz et al. | 353/19 |
| 2,986,609 | 5/1961 | Hoshino et al. | 360/101 |
| 3,145,616 | 8/1964 | Schwartz et al. | 353/19 |
| 3,185,776 | 5/1965 | Bender | 360/101 |
| 3,230,824 | 1/1966 | Schwartz et al. | 353/19 |
| 3,242,605 | 3/1966 | Kleinschmidt | 353/120 |
| 3,251,263 | 5/1966 | Gerry | 353/19 |
| 3,296,925 | 1/1967 | Yamamoto | 353/19 |
| 3,471,654 | 10/1969 | Dollenmayer | 353/19 |
| 3,751,151 | 8/1973 | Petterson | 353/19 |
| 3,807,851 | 4/1974 | Knox et al. | 353/120 |

Primary Examiner—Steven L. Stephan
Attorney, Agent, or Firm—Hane, Sullivan & Spiecens

[57] ABSTRACT

There is disclosed sound slide assemblages which comprise a generally rectangular body incorporating an image bearing portion and a magnetic sound track portion. The image bearing portion is adapted to receive either a mounted or unmounted transparency. The sound track portion is contiguous to the image bearing portion and is capable of receiving sound tracks having various configurations such as spiral, arcuate, parallel and sinuous. The assemblages are characterized by their thinness and simplicity of structure.

1 Claim, 28 Drawing Figures

SOUND SLIDE

The present application is a continuation-in-part application based on copending application Ser. No. 402,168, filed Oct. 1, 1973 and now issued as U.S. Pat. No. 3,897,145, on June 29, 1975.

The present invention relates to a sound slide, and more particularly to the construction thereof, the arrangement of receiving the image-carrying element and the arrangement of the sound track patterns on the magnetic recording surface.

BACKGROUND

It has long been desirable to combine an audible message with the display of a slide transparency and in recent years various arrangements have been devised whereby the sound track for the audible message has been made part of an assemblage which also includes the slide transparency. The Kalart Kalavox (TM) and the 3M Sound-On-Slide (TM) projector are two devices which utilize sound slides for delivering both a projected visual image and an audible message from such a slide. These devices have a wide range of use in such areas as training, education and entertainment.

Most sound slides of the prior art will record and reproduce an audible message lasting from 30 to 60 seconds. They employ a plastic body which carries the sound recording material and also accepts a 24×36 mm transparency premounted in the conventional cardboard or plastic mount which is 2×2 inches and from 45 to 70 thousandths of an inch thick. The 2×2 inch mounted slide is readily inserted into the plastic body of the sound slide by the user. The most well-known sound slides of the prior art use either an annular sound track area surrounding the 24×36 mm image area or a magnetic tape chamber or cassette to one side of the 24×36 mm image area. Such sound slides vary in size from 3¼ × 3¼ inches, 2⅝ × 4¾ inches and range from 7/32 inch in thickness to 7/16 inch in thickness.

In U.S. Patent application Ser. No. 402,168, assigned to the assignee of the present invention, simpler and more economically fabricated sound slide structure has been disclosed. The projectors for use with the present invention comprise the customary projection head consisting of a lamp, a picture gate which accepts the transparency portion of the sound slide and the projection lens, together with the sound recording and reproducing segment which scans the sound track while the associated picture is projected. Another segment of the projector feeds the slide from a magazine into the gate and the sound segment, and removes the slide, replacing it in its previous position in the magazine.

The assignee herein has disclosed sound slide projectors employing tape cassettes in U.S. Pats. Nos. 3,232,167, 3,408,139, 3,561,856, and 3,563,644, while sound slide assemblies carrying adjacent picture sections and sound record sections are disclosed in the assignees U.S. Pat. Nos. 2,961,922, 3,145,616, 3,185,773 and 3,191,494.

Although the approaches employed in the aforementioned patents to combine audible and visual messages on a common carrier have certain advantages and have been employed successfully, the applicant believes that further improvements are necessary if more satisfactory and more economical results are to be obtained. It is to such improvements that the present invention is directed.

THE INVENTION

It is the broad object of this invention to provide a novel and improved slide which carries both a transparency and a sound track area of maximal size in relation to both the overall dimensions and the occupied volume of the slide.

Another broad object of the invention is to provide a simpler and more economical sound slide construction.

A more specific objective is to provide a variety of sound track configurations matching the forms produced by different sound-head driving mechanisms leading to greater compactness of the mechanism.

Another more specific objective of this invention is to improve the quality of the recorded and reproduced sound through improved cushioning of the magnetic recording surface.

Another more specific objective of this invention is to provide improved sound slides for accepting unmounted film as well as mounted film.

Still other objects, features and advantages of the invention will be pointed out hereinafter and set forth in the appended claims.

SUMMARY OF THE INVENTION

The aforepointed out objects, features and advantages, and other objects, features and advantages of the sound slides which will be pointed out in detail hereinafter are obtained through the use of a playback and recording assemblage for a sound slide projector which includes a recording and playback mechanism and sound slides for use with such mechanis. Such assemblages will be referred to only briefly as their details are not part of the present invention. The sound slides have a frame including a first portion defining a window for accommodating therein a transparency to be projected by the projector, and a second portion constituting a sound track carrier. This carrier is coated on opposite sides with layers of magnetic material for recording thereon sound tracks and playing back such sound tracks. The recording and playback mechanism with which the slides to be used includes one or more pairs of sound heads for recording sound tracks on the layers and scanning the same. The sound heads are supported by a carrier which is linearly displaceable, rotatable or both linearly displaceable and rotatable simultaneously.

BRIEF DESCRIPTION OF THE DRAWINGS

In the accompanying drawing, several preferred embodiments of the invention are shown by way of illustration and not by way of limitation.

In the drawing.

DETAILED DESCRIPTION OF THE DRAWINGS

As previously indicated, the present invention relates to a recording and playback mechanism of a sound slide projector, and also to sound slides suitable for use with the mechanism, but it is not concerned with the optical assembly and the sound assembly of the projector. Accordingly, the drawing figures are limited to the recording and playback mechanism and the sound slide, the optical assembly and the sound assembly; the circuit components and the required connections therefor are presumed to be conventional. The projector may be visualized as being manually operated, that is, the slides must be inserted one-by-one and also withdrawn one-by-one, or as being an automatic projector which accommodates simultaneously a plurality of slides which are successively moved into and out of a presentation position — that is, a position in which the transparency mounted in the slide is projected and the associated message is played back.

Figure 1:
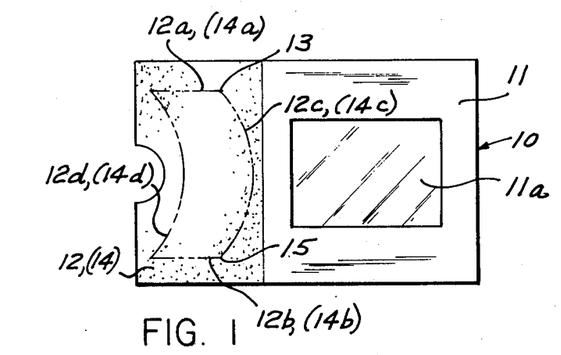
FIG. 1 is a plan view of a sound slide according to the invention for use with a recording and playback mechanism according to the invention.

Referring now to the figures, and first to FIG. 1, this figure shows a slide 10 which comprises a flat frame 11 including a window or opening in which is mounted a transparency 11a in a conventional manner. The frame is also generally conventional, usually made of cardboard or plastic, except that one side of the frame is extended to accommodate a magnetic layer 12 on the visible or upper side of the frame and a similar layer 14 on the opposte or bottom side. The area thus available for recording sound tracks and scanning the same is bounded by an entry edge 12a and an exit edge 12b for starting a first track 12c and an edge 12d defining the innermost allowable track. Similarly, for layer 14, the entry edge is 14a, the exit edge 14b, the starting track 14c and the final track edge 14d.

Scanning starts at the juncture of lines 12a and 12c and hence, as will be described hereinafter, the head must contact the magnetic layer at the corner 13 and leaves it at the corner 15. Making the space between the edge of frame 11 and the magnetic layer 12 to be one-fourth of an inch, the geometry works out to be approximately 0.9 sec/90° scan time or 3.6 sec/rev at 1⅞ inches/sec which is the standard speed of sound heads. Assuming that 30 seconds playback time are to be available, with tracks approximately 0.28/in. apart, FIG. 1 shows the required area in scale and allows space for a conventional scriber/type follower in a mechanical groove and for adjustments.

As will be noted, the sound tracks are shown to be curved along a circular path for reasons which will appear from the subsequent description.

While the dimensions, the time and speed date as given herein have been found to be practical, the inventive concept is, of course, not limited to the stated dimensions and the time and speed data, but may be modified as desired.

Referring now to the recording and playback mechanism as shown in detail in FIGS. 2 to 6, playback or scanning is described as a matter of convenience, but as it is evident, recording may be carried out in essentially the same and well understood manner.

Figure 2:
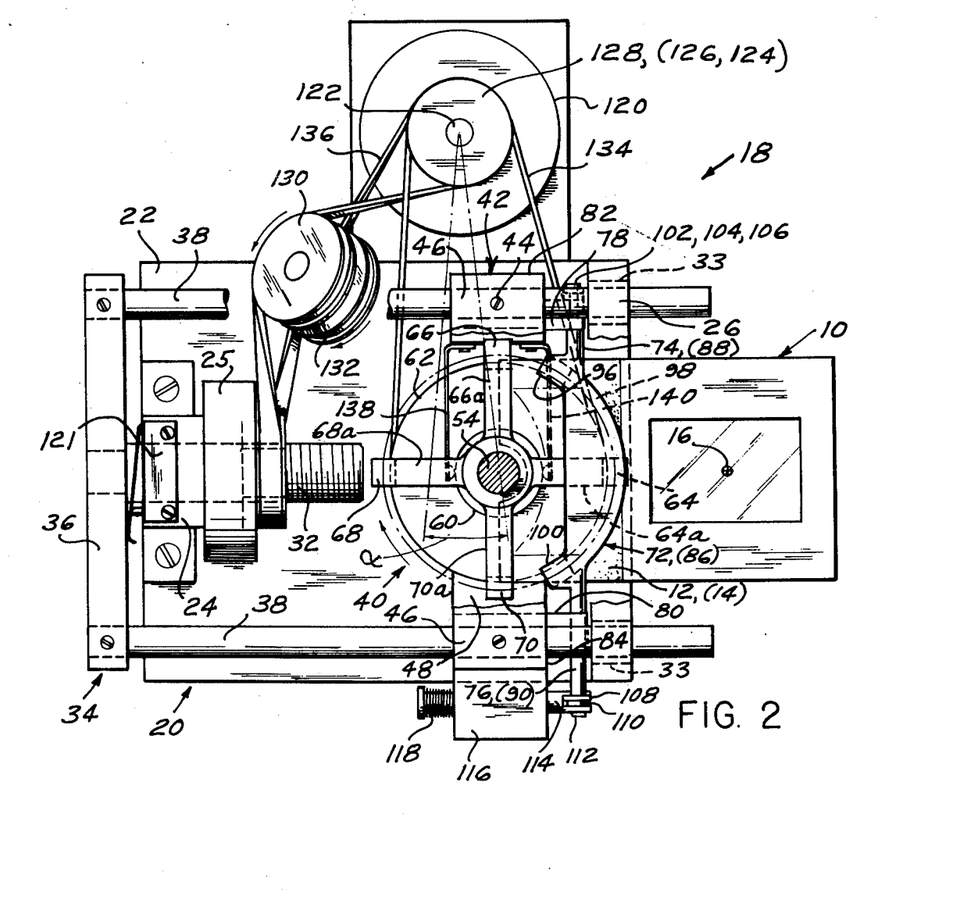
FIG. 2 is a plan view of a recording and playback mechanism arranged for accepting a sound slide according to FIG. 1.
Figures 3, 7, 8:
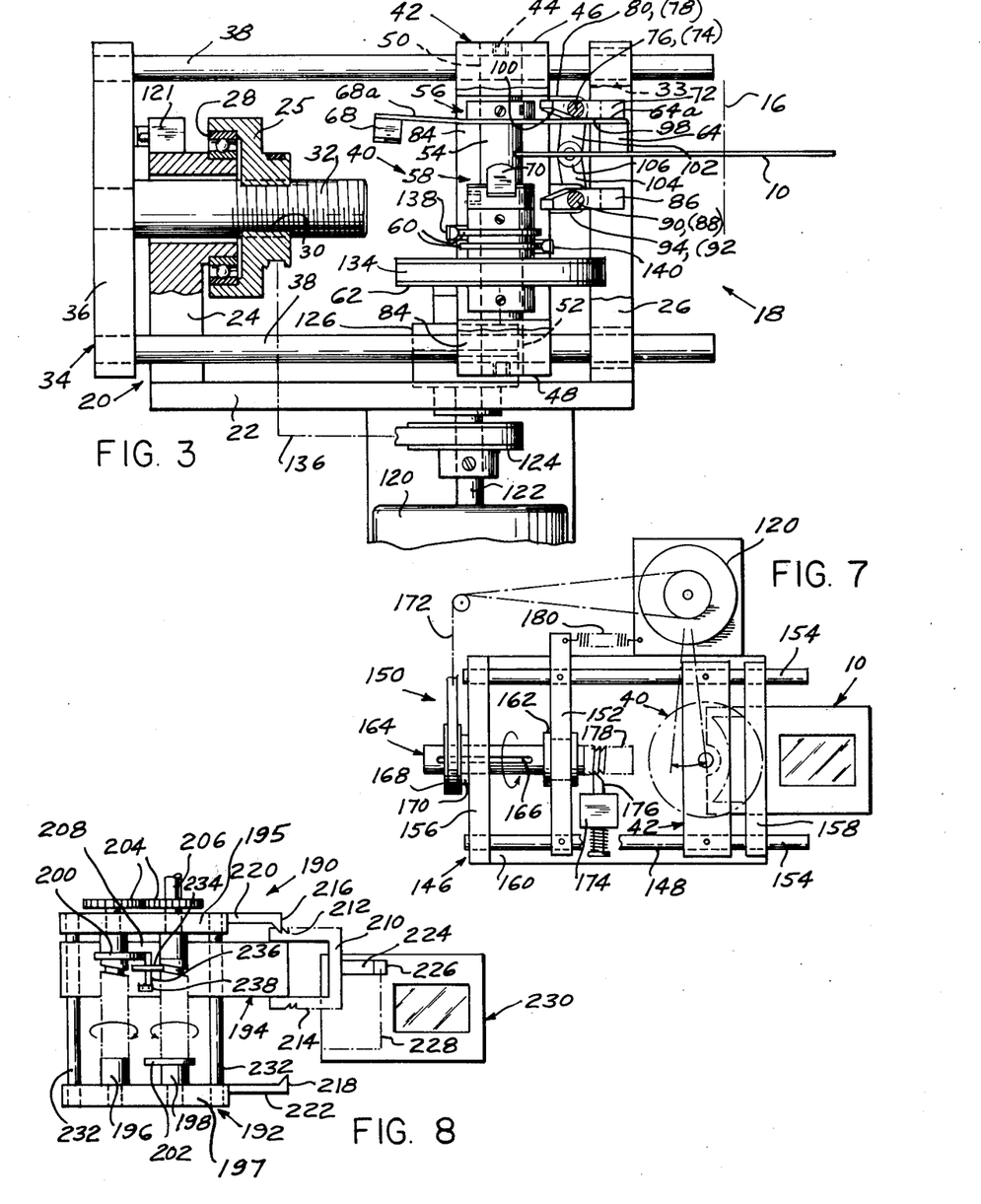
FIG. 3 is a fragmentary elevational view of FIG. 2.
FIG. 7 is a fragmentary plan view of a modification of the recording and playback mechanism according to the invention.
FIG. 8 is a plan view of still another modification of a recording and playback mechanism according to the invention.

The exemplified mechanism comprises a stationary assembly 20 including a plate 22 and two vertically supported members 24 and 26. Member 24 spindles a sheave 25 by means of a bearing 28. The sheave has an internal thread 30 engaging a threaded shaft 32 and member 26 is in the shape of an inverted U bored at its four corners to receive low-friction sleeves 33.

A movable asembly 34 includes a plate 36 in which are fixedly mounted shaft 32 and four slide rods 38 at the four corners to center with sleeve 33 and slide through the same.

A carrier assembly 40 is supported in a rectangular frame 42 fixed to rods 38 by set screws 44. The midpoint of horizontal portions 46 and 48 of frame 42 mount bearings 50, 52 for spindling a shaft 54. This shaft is the carrier for an upper scanner unit 56, a lower scanner unit 58, a commutator 60 and a sheave 62.

Upper scanner 56 includes two heads 64, 68 mounted on leaf springs 64a, 68a. These heads coact with the layer 12 as will be more fully explained hereinafter. Lower scanner 58 includes two heads 66, 70 mounted on leaf springs 66a, 70a. Heads 66 and 70 coact with layer 14 as will also be explained hereinafter. The springs are biased to keep the heads normally out of the planes of contact with magnetic layers 12 and 14 previously described.

Assuming that a scanning head rotates about a shaft such as shaft 54 while the shaft is linearly displaced, such head could conceivably scan 180°. However, the required track separation at the entry and the exit edges would make the required areas of the magnetic layers very long, and this in turn would considerably complicate the design of the assembly and thus of the sould slide projector in which the assembly is to be used. The use of six heads, that is, three on the top layer and three on the bottom layer, would require each head to scan 60°. This is theoretically desirable, but too expensive and complicated; accordingly, the use of four heads, two on each side, appears to be the best choice as it permits an arrangement of the heads so that the heads for each side are spaced 180° — so that the two layers are oriented 90° apart. As a result, each head has to scan 90° and this is an acceptable angle since the overall dimensions of a standard slide frame need to be extended only to acceptable limits. Of course, the concept of the invention encompasses the use of only one pair of heads or more than two pairs if found desirable.

As it is clearly shown, the four heads 64, 68, 66 and 70 are circumferentially spaced and the spacing of the heads is such that insertion of a slide 10 into the recording or playback position in which it is illustrated in FIG. 2, leaves a narrow gap between the heads and layers 12 and 14. It should be noted that the playback position should be visualized as being also the projection position, that is, the center of the transparency accommodated in the slide coincides with a center line 16 of the optical assembly (not shown) of the projector. Moreover, it should be understood that the slide must be so arranged in the assembly that it can be removed either manually or automatically upon the completion of a presentation of the slide, that is, upon projection accompanied by playback of the associated message. Means for inserting or withdrawing of a slide are not shown since, as previously stated, such means would constitute part of projector assemblies which are not essential for the understanding of the invention and should be assumed to be conventional.

As it is apparent from FIG. 2, the heads in the inactive position thereof, that is, in the position in which the heads do not coact with layers 12 and 14, are such that, as previously stated, there is a narrow gap between the heads and the layers, the heads being biased into such positions by the action of the leaf springs 64a, 68a and 66a, 70a mounting the heads.

To effect movements of the heads into coaction with the layers, actuating means are provided which will now be described. The actuating means comprise an upper cam 72 having pivot posts 74, 76 journaled in brackets 78, 80 fixed on vertical portions 82, 84 of frame 42. Similarly, a lower cam 86 having pivot posts 88, 90 is journaled in brackets 92, 94. Cam 72 includes a rise portion 96, a dwell portion 98 for an angular travel of 90°, and a fall portion 100. Similarly, cam 86 includes a rise portion, a dwell portion and a fall portion. Posts 74, 88 terminate in links 102, 104 connected by a rotatable pin 106. Posts 76, 90 terminate in links 108, 110 and are connected by a rotatable pin 112. This pin passes through an actuating rod 114 of a solenoid 116. A spring 118 biases rod 114 into the de-energized position of the solenoid as shown in FIG. 2. In this position the cams are in the operative position, that is, they cause the heads to be in engagement with layers 12 and 14. Energization of the solenoid will move the cams into positions in which the upper scanner 56 including heads 64, 68 and the lower scanner 58 including heads 66, 70 are not in contact with layers 12, 14 on slide 10.

To drive the scanners so that they will both rotate for displacing the heads relative to the layers, a reversible motor 120 drives via its shaft 122 a sheave 124, a unidirectional clutch 126 and a second sheave 128. A belt 136 on sheave 124 connects this sheave to sheave 25. There is indicated in FIG. 2 the angle through which belt 136 moves as it drives sheave 25. Theoretically, the sheave is driven along a circular path but the curvature is so shallow that it is negligible and hence may be treated as a straight path.

To change the direction from the driving sheave to the driven sheave, a pair of idler pulleys 130, 132 are provided and mounted on a fixed bracket (not shown). Another belt 134 on sheave 128 connects to sheave 62.

Energization of motor 120 in clockwise direction causes scanners 56 and 68 to be returned to the starting position without being rotated by providing speed change means for reversing the rotational direction of the motor; assembly 34 can be returned quickly to its starting position while avoiding an undesirable high speed rotation of the scanners in the opposite direction.

Let it now be assumed that the slide 10 is placed in the playback and projection position and held in this position, a suitable and conventional circuit system (not shown) now energizes motor 120 and playback starts. At any point of either layer 12 or 14 upon completion of the message recorded thereon, a signal recorded in a sound track on one of the layers energizes solenoid 116 thereby causing movement of the heads out of contact with the layers as previously described, and also reverses motor 120. When assembly 34 is returned into its starting position, a reverse running time control which is synchronized with a slide changing mechanism (not shown) actuates a limit switch 121. This actuation of this switch de-energizes solenoid 116 and connects motor 120 for forward drive to begin scanning of the next slide which is presumed to be now positioned in the playing position.

Playback input is obtained by connecting all heads in parallel to commutator rings 60. Brushes 138, 140 coact with these rings. The brushes should be visualized as being suitably connected to the sound assembly of the projector. As previously pointed out, the sound assembly of the projector and its connections are presumed to be conventional and are hence not shown in detail.

Figure 4:
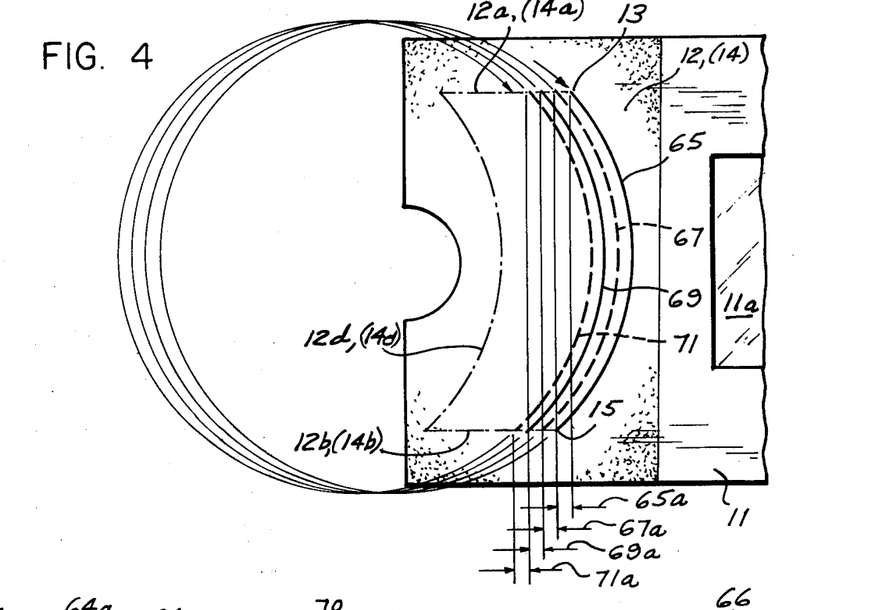
FIG. 4 is a diagram of a continuous path of tracks as recorded or played back by the heads of the mechanism according to FIGS. 2 and 3 on a slide as shown in FIG. 1.
Figures 5, 6:
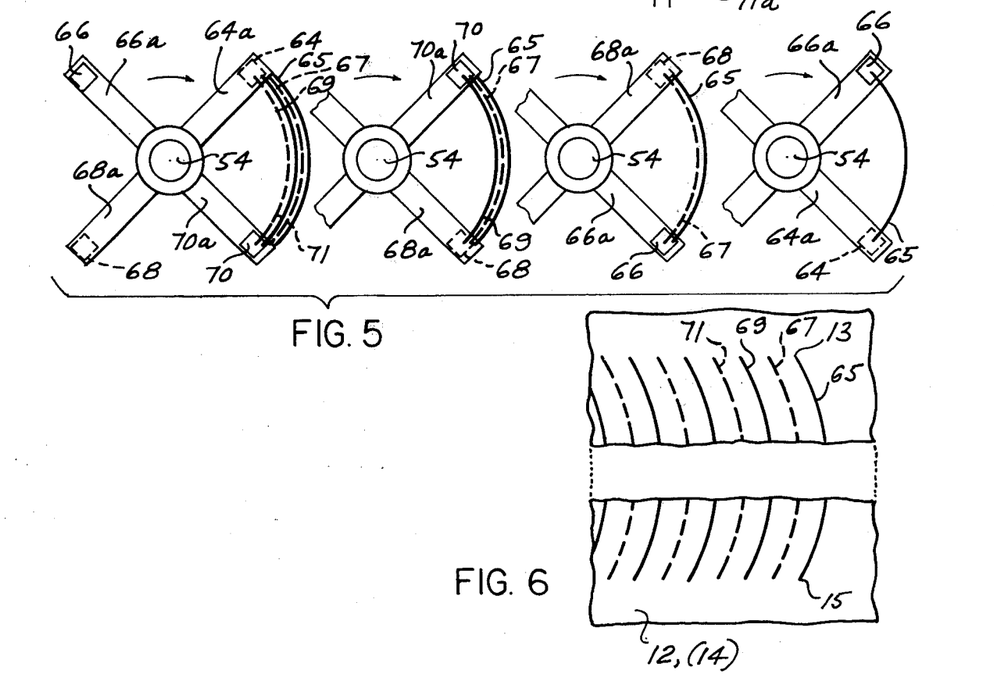
FIG. 5 shows a recording and playback heads of the mechanism in typical different positions during recording and playback.
FIG. 6 is a diagrammatic view of a finished sound track pattern on the slide of FIG. 1 on an enlarged scale.

Referring now to FIGS. 4, 5 and 6, these figures show diagrammatically the recording or scanning of sound tracks on layers 12 and 14.

More specifically, FIG. 4 shows in detail the operations by which the sound tracks are recorded or scanned. As stated before, there are four sound heads, namely, heads 64, 68 and 66, 70; heads 64, 68 coact with the top side of the magnetic layer as shown in FIG. 1, that is, layer 12, and heads 66, 70 coact with layer 14, that is, the bottom side.

As further described hereinbefore, the sound heads when in operation are rotated about the center axis of shaft 54 which, in turn, is linearly displaced from right to left as shown in FIG. 2. The sound tracks on top layer 12 are shown in FIG. 4 in full lines and the sound tracks on layer 14 in dashed lines. The recording or scanning starts with sound track 65 on layer 12. The entrance point for this sound track is point 15. However, due to the combined movements imparted to the heads while operating, the heads do not perform a circular movement relative to the layer, but a slightly oval one. Accordingly, point 15 is not on the same line with point 13 as it would be if the heads would rotate only, but is slightly displaced as it is indicated at 65a. After completion of line 65 on layer 12, track 16 is recorded or scanned as the first track on the bottom layer 14. Again, the second track is slightly distorted with respect to a circular path as it is indicated at 67a. The third sound track 69 is recorded or scanned on layer 12; its distortion is indicated at 69a and the fourth layer 71 is recorded or scanned on layer 14. Its distortion is indicated at 71a. Such recording or scanning is continued until the innermost track is reached, indicated by 12d(14d).

FIG. 5 illustrates the specific movements of the four sound heads carried by springs 64a, 68a, and 66a, 70a. As indicated before, heads 64, 68 are the upper heads and heads 66, 70 are the lower heads. The figure shows the upper heads with solid lines and the lower heads with dashed lines.

Proceeding from right to left, head 64 has finished the recording or scanning of the first sound track referred to in FIG. 4 as track 65. In the next figure, head 66 has recorded or scanned the second sound track, that is, the first bottom track referred to in FIG. 4 as track 67. In the third figure, head 68 has recorded or scanned the fourth sound track, that is, the second bottom track, and so forth.

Finally, FIG. 6 shows on an enlarged scale the pattern of the top and bottom tracks as are recorded or scanned by the recording and playback assembly according to FIGS. 2 and 3.

As it is now apparent, utilization of both sides of the extension of slide frame 11 at one side thereof permits recording or scanning of a relatively long message without changing the general configuration of slides, thereby facilitating adaptation of conventional sound slide projectors so that the projectors will accept sound slides as disclosed herein and also standard slides.

According to the exemplification of the mechanism as shown in FIG. 7, an assembly 150 for moving frame 42 and rotating head carrier assembly 40 to obtain recorded areas 12 and 14, comprises a stationary assembly 146 and a moving assembly 148.

Moving assembly 148 includes frame 42 and heads assembly 40 pinned to a pair of rods 154. Also pinned to these rods is a bridging member 152 including a bearing 162 which spindles a shaft 164. The shaft is assembled to the bearing in a manner (not shown) so that the shaft can rotate but is constrained against axial movement.

Shaft 164 is provided with a spline 166 along part of its length and at its end facing slide 10 with a steep wall or buttress thread 178.

Stationary assembly 146 comprises a base 160 on which a pair of plates 156 and 158 slidably support rods 154. The frame 42, rods 154, member 152 and shaft 164 can thus move as a unit from left to right.

A bearing 170, set into plate 156, spindles a pulley 168 which has a tooth (not shown) that engages a spline 166. Pulley 168 is driven, as in the previously described embodiment, by motor 120 and a belt 172.

The armature of a solenoid 174 terminates in a pawl 176 movable into and out of engagement with thread 178 on shaft 164.

Finally, a spring 180 connected between bridging member 152 and base 160 biases assembly 148 to the right. The limiting position shown in the figure is at the point where a microswitch (not shown) similar to switch 121 in FIG. 2 is operated.

FIG. 7 shows the start position of playback or scanning. The micro-switch has energized solenoid 174, causing pawl 176 to enter thread 178, and has also started the motor. Rotation of shaft 164, as indicated by the arrow, will compel assembly 148 to move smoothly from right to left while motor belt 134 turns heads assembly 40.

Referring to FIG. 8, another modified mechanism 190 of recording and playing back a slide 230, having an adjoining sound recording surface, operates in an alternate scanning mode whereby the recording paths are straight rather than arcuate. Mechanism 190 comprises a stationary assembly 192 and a movable assembly 194.

Assembly 192 includes a base 193 on which are mounted two plates 195 and 197. These plates have affixed therein a pair of slide rods 232. Between these rods, a pair of bearings in each plate 195 and 197 spindle two helically-grooved shafts 196 and 198 which are connected through a pair of identical gears 204 so that rotation is equal and opposed in direction as shown by the arrows. Shaft 198 extends to a driving shaft 206 connected to a motor (not shown). Shaft 196 is provided with a cam 200 at one end and shaft 198 is provided with a cam 202 at the opposite end. An arm 220 on plate 195 is provided with a fixed pawl 216 and an arm 222 on plate 197 is provided with a fixed pawl 218.

Movable assembly 194 comprises a plate 208 and a yoke assembly 210. Plate 208 is provided with low-friction borings for slidable engagement with rods 232. Plate 208 slidably supports yoke 210 so that the yoke can move from right to left. Yoke 210 is machined to include or has attached thereto an opposing pair of movable ratchets 212 and 214. Finally, yoke 210 has an extension 224 to which is affixed a sound recording or playback head 226 for a scanning and recording area 228 on a sound-slide 230.

A cam follower 236 is retained on a plate 208 by means, not shown, in a manner so that it can shift left or right into either one of two positions in a detent 238. Cam follower 236 is moved to the right by turning cam 200 and to the left by turning cam 202. A drive pin 234 attached to the follower thus engages the helix of either shaft 196 or 198 depending upon the action of cam 202 or cam 200, respectively. Thus, on rotating shaft 206, plate 208 shuttles back and forth.

At the end of each traverse, ratchets 212 and 214 engage pawls 216 and 218, respectively, each engagement being translated into a left-directed shift of plate 210. In this manner, area 228 is scanned by moving across in one track and returning in the next track.

By extension of this mode of scanning, plate 210 may have another arm and record/playback head underneath the one shown for application to a sound-slide similar to that of FIG. 1. The only change needed for this purpose is in the pitch of ratchets 212 and 214. Alternately, one arm and its pawl can be eliminated so that the underlying sound track is directly under the overlying sound track, the left-directed shift taking place once only after each traverse and return of arm 208.

Referring now to FIGS. 9 to 14A, the sound slides shown in these figures and also the sound slide shown in FIG. 1 are not limited to the sound slide projector as hereinbefore described. It should be understood that there are known appropriate means, both manual and automatic, for feeding the sound slides as well as appropriate means for producing and maintaining the necessary physical and geometric relationships between the pick up and the magnetic track. It sould also be understood that the scanning patterns shown on the enclosed embodiments of slides can be interchanged with each other, that is, they are shown as examples on a particular sound slide type.

Figure 9:
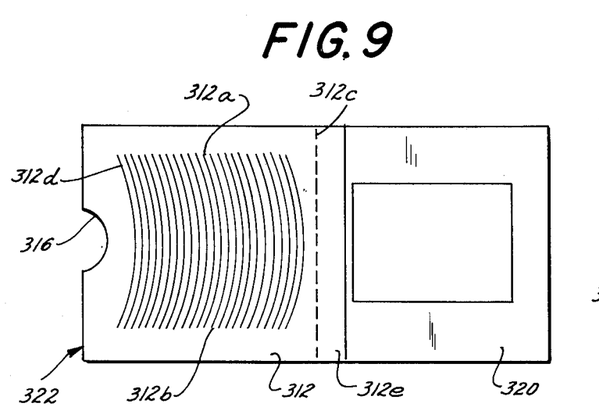
FIG. 9 is a plan view of a two piece sound slide having an arcuate sound track, the area for which has been expanded over that shown in FIG. 1 to provide longer playing time.
Figure 9A:
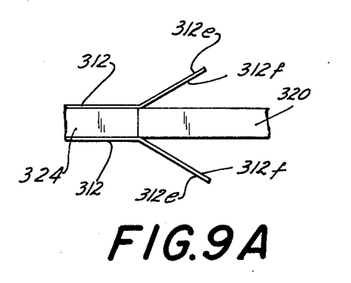
FIG. 9A is an enlarged view of part of the sound slide of FIG. 2 prior to assembly.
Figure 9B:
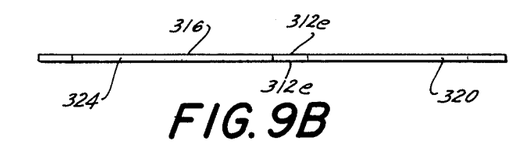
FIG. 9B is an edge view of the sound slide of FIG. 2.

FIG. 9 shows a sound slide having an arcuate sound track similar to that of FIG. 1 except that it has been extended in size to provide between 60 and 120 seconds of play. It differs from the sound slide of FIG. 1 further in that it is not of unitary construction but comprises a normal slide portion 320 consisting of the customary cardboard mounted transparency, and a sound portion 322. The latter comprises a substantially rectangular body portion 324 covered on both sides wih a magnetic recording layer 312 with or without an intervening cushioning layer to be described below. At one end the magnetic recording layers overlap the edge by approximately one-fourth inch as as at 312e and are covered with adhesive on their inner surfaces 312f as shown in FIG. 9A. With the transparency mount 320 properly juxtaposed, the flaps 312e are pressed against the mount to produce a sound slide from an existing cardboard mounted transparency without the requirement to transfer the transparency to another special full mount. This type of sound slide adaptation is intended for application by the user who already possesses a number of slides which are to be converted to sound slides in quick, economical fashion. It is obvious that the use of two sound heads simultaneously, one on each magnetic recording surface will allow stereophinc recording and reproduction.

Figures 10, 10A, 10B:
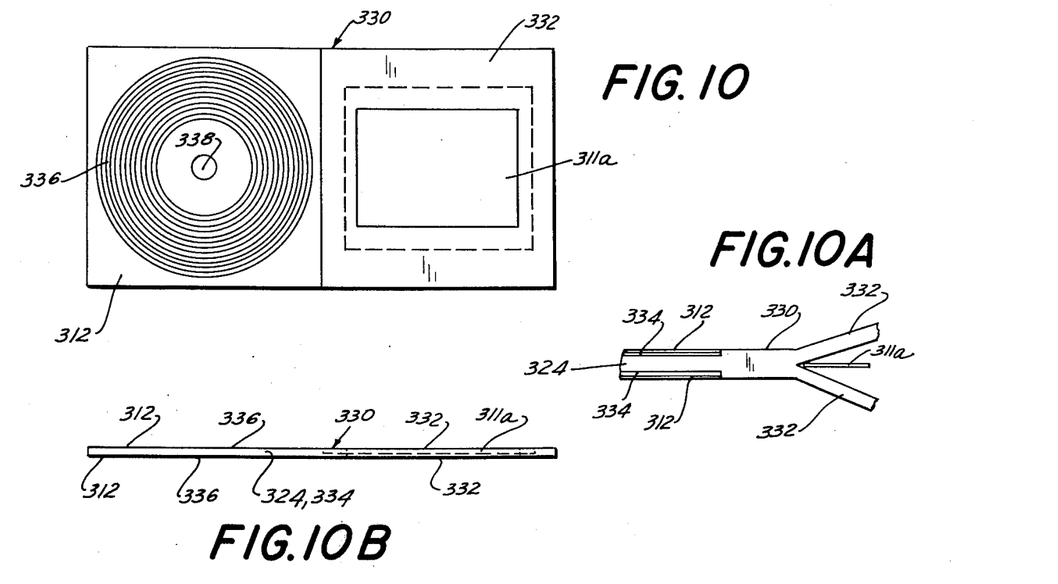
FIG. 10 is a plan view of a unitary sound slide adapted for accepting a piece of unmounted film and is shown carrying a spiral sound track.
FIG. 10A is an edge view of the sound slide of FIG. 3.
FIG. 10B is an another edge view of the sound slide of FIG. 3.

FIG. 10 shows a sound slide comprising a body 330 of either cardboard or plastic, adapted for unmounted film which may be inserted either by the user or at the commercial processor of the film. The film receiving end of body 330 is split as at 332 to accept film 311a. After the film is properly positioned, portions 332 of the body are cemented together with any suitable adhesive, or by heat sealing, to thereby contain the film. The sound recording end of the body consists of a top layer of magnetic recording film 312 attached to a layer 334 of cushioning material which is preferably 0.010 inch to 0.030 inch thick and made from closed cell vinyl foam, polyethylene foam or neoprene. This in turn is cemented to the cardboard or plastic core 324 of the sound slide body 330. In this particular form of sound slide the recording 336 is shown to be spiral in shape and concentric with registry hole 338.

Figure 11:
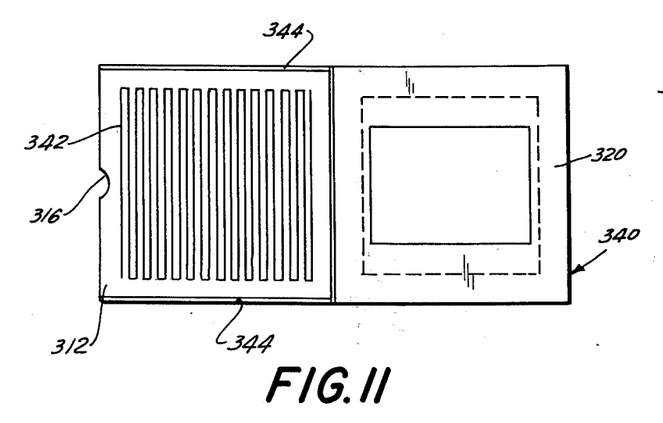
FIG. 11 is a plan view of a unitary sound slide adapted for accepting mounted slides and is shown carrying a sinous sound track.
Figure 11A:
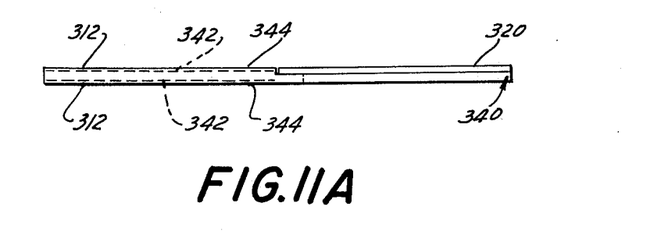
FIG. 11A is an edge view of the sound slide of FIG. 11.
Figure 11B:
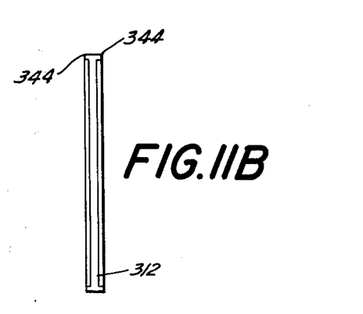
FIG. 11B is an end view of the sound slide of FIG. 11.

FIG. 11 shows a sound slide having a plastic or cardboard body 340 adapted to accept a mounted side 320 and is shown with a sinuous sound track 342. The sound recording portion of the sound slide is covered with a layer 312 of the magnetic recording material over an intermediate cushioning layer (not shown) as in FIG. 10. In this sound slide the magnetic recording surface is protected from damage, such as may occur when a number of slides are stacked together, by a raised rim 344 which extends on two opposite sides of the magnetic recording area, as shown. The overall thickness of the sound slide body is preferably between 80 thousandths and 140 thousandths of an inch, the body thickness at the slide accepting portion being approximately 50 thousandths of an inch less in order to present a substantially uniform thickness when the mounted slide is attached.

Figure 12:
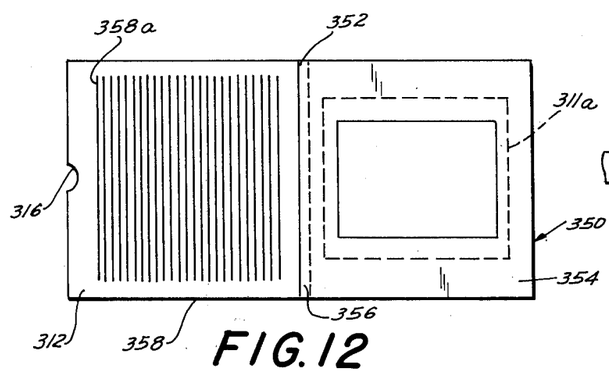
FIG. 12 is a plan view of a unitary hinged sound slide adapted for accepting unmounted film and is shown carrying a parallel sound track.
Figure 12A:
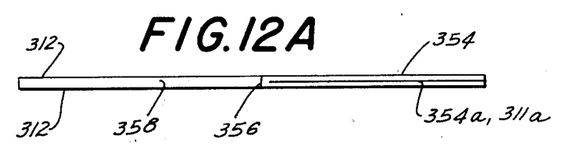
FIG. 12A is a side view of the sound slide of FIG. 12.
Figure 12B:
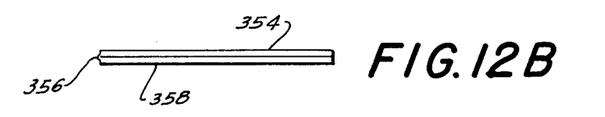
FIG. 12B is a side view of the sound slide of FIG. 12 shown in folded position.
Figure 12C:
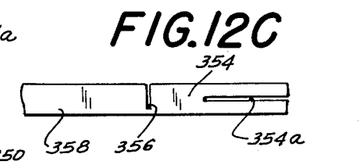
FIG. 12C is an enlarged view of part of FIG. 12A.
Figure 12D:
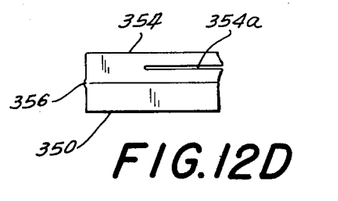
FIG. 12D is an enlarged view of part of FIG. 12B.

FIG. 12 shows a unitary all-plastic slide 350 wherein the slide holding portion and the sound track portion are of approximately equal area and are divided at their juncture by an integral hinge made of the same plastic as the body. Polyethylene and polypropylene are two examples of plastics which are suitable for the material from which the body 352 is made. At the picture area 354, the body is split as at 354a to accept a piece of unmounted film 311a. The integral hinge is formed by a thin web 356 which permits the flat slide shown in FIG. 12A to be folded into a flat, double-thick form as shown in FIG. 12B. The details of the hinge and the film accepting split are shown in enlarged FIGS. 12C and 12D. Sound recording area 358 is covered with magnetic recording material 312 and in this particular modification is shown with a parallel sound track 358a. In use this type of sound slide normally stored in either open or folded form, can be fed into the projector in planar form as in FIGS. 12 and 12A or with the sound record portion 358 at approximately right angles to the picture portion 354.

Figure 13:
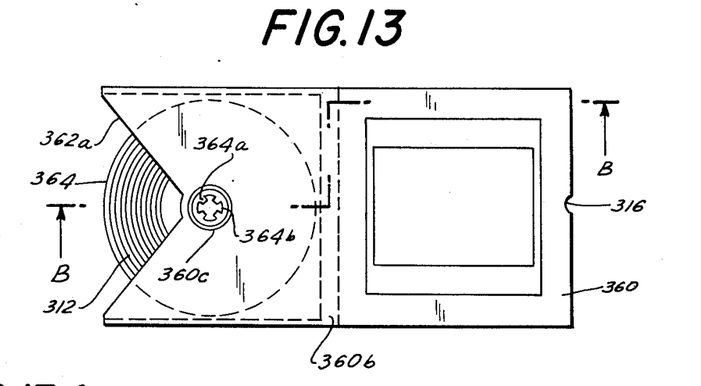
FIG. 13 is a side view of a sound slide adapted for accepting mounted slides and provided with a rotatable recording disc.
Figure 13A:
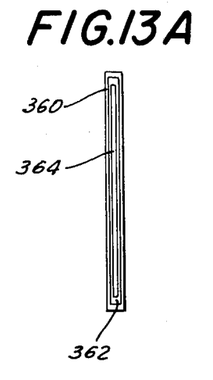
FIG. 13A is an end view of the sound slide of FIG. 13.
Figures 13B, 13C:
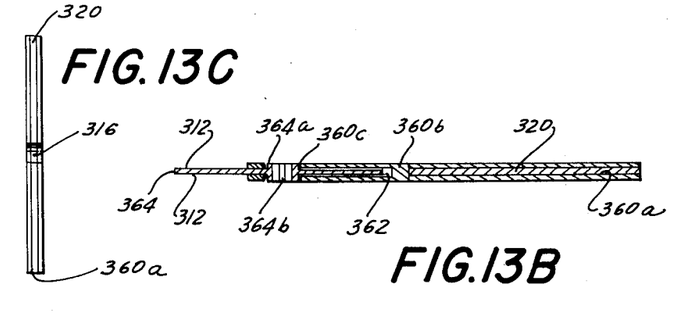
FIG. 13B is a section of the sound slide of FIG. 13 along line B-B of FIG. 12.
FIG. 13C is an end view of FIG. 13.

FIG. 13 shows a sound slide in which the sound is recorded on a rotating disc held within a cavity 362 formed by the sound slide body 360. The slide receiving portion of the body is provided with a deep slotted opening 360A to receive a mounted slide 320. A solid rib 360b separates the slide portion from the cavity portion 362 into which is received a rotatable sound recording disc 364 covered with magnetic recording material 312 and provided with a central, hollow, double ended spindle 364A which is accepted by holes 360C in opposite walls of cavity portion 362. Part of both flat walls at the open side of cavity portion 362 are cut away as at 362a to provide access to the disc for recording and reproduction head, not shown. The spindle 364a is provided with splines 364b at its inner surface. Hence, disc 364, free to rotate in holes 360c can be driven either at its rim or through the splined center. The recording and reproduction head produces a spinal sound track on the disc, either with or without the use of guide grooves.

Figure 14:
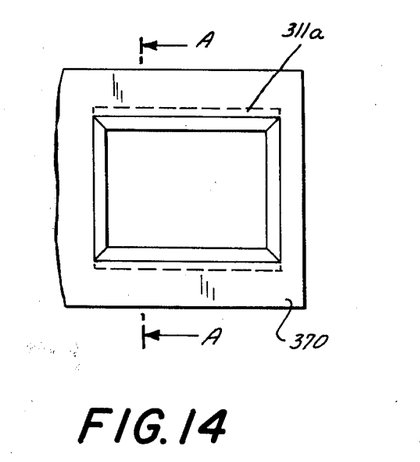
FIG. 14 is a plan view of the film accepting portion of a modification of FIG. 13.
Figure 14A:
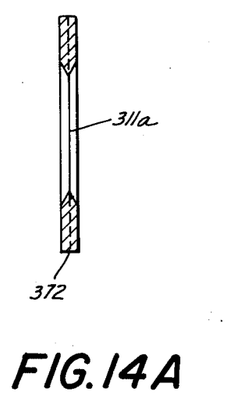
FIG. 14A is a cross-section of the sound slide of FIG. 14 along lines AA.

FIGS. 14 and 14A show only the slide receiving portion 370 of a sound slide which is otherwise identical to that shown in FIG. 13, and is intended to accept an unmounted slide. Portion 370 is made with a planar slit 372 into which the film 311a is inserted and heat sealed or cemented into place.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A sound slide assembly comprising: a substantially rectangular plate-shaped frame body made of rigid material, said body incorporating an image-bearing section and a magnetic sound track section, said image-bearing section including four side portions defining one opening adapted to receive and maintain in fixed position a photographic transparecny, one of said side portions having a crosswise width larger than the other side portions, said one side portion constituting a support base for said sound track section, said support base being covered on its opposite surfaces with magnetic recording material for receiving on said material on each of said surfaces a sound track, and a hinge section joining the image-bearing section and the sound track section for varying the angle between the plane of said image-bearing section relative to the plane of said sound track section, said hinge being disposed perpendicular to the long dimension of the rectangular body.

* * * * *